(No Model.) 6 Sheets—Sheet 1.
W. E. KANE.
HUB BORING MACHINE.
No. 486,407. Patented Nov. 15, 1892.
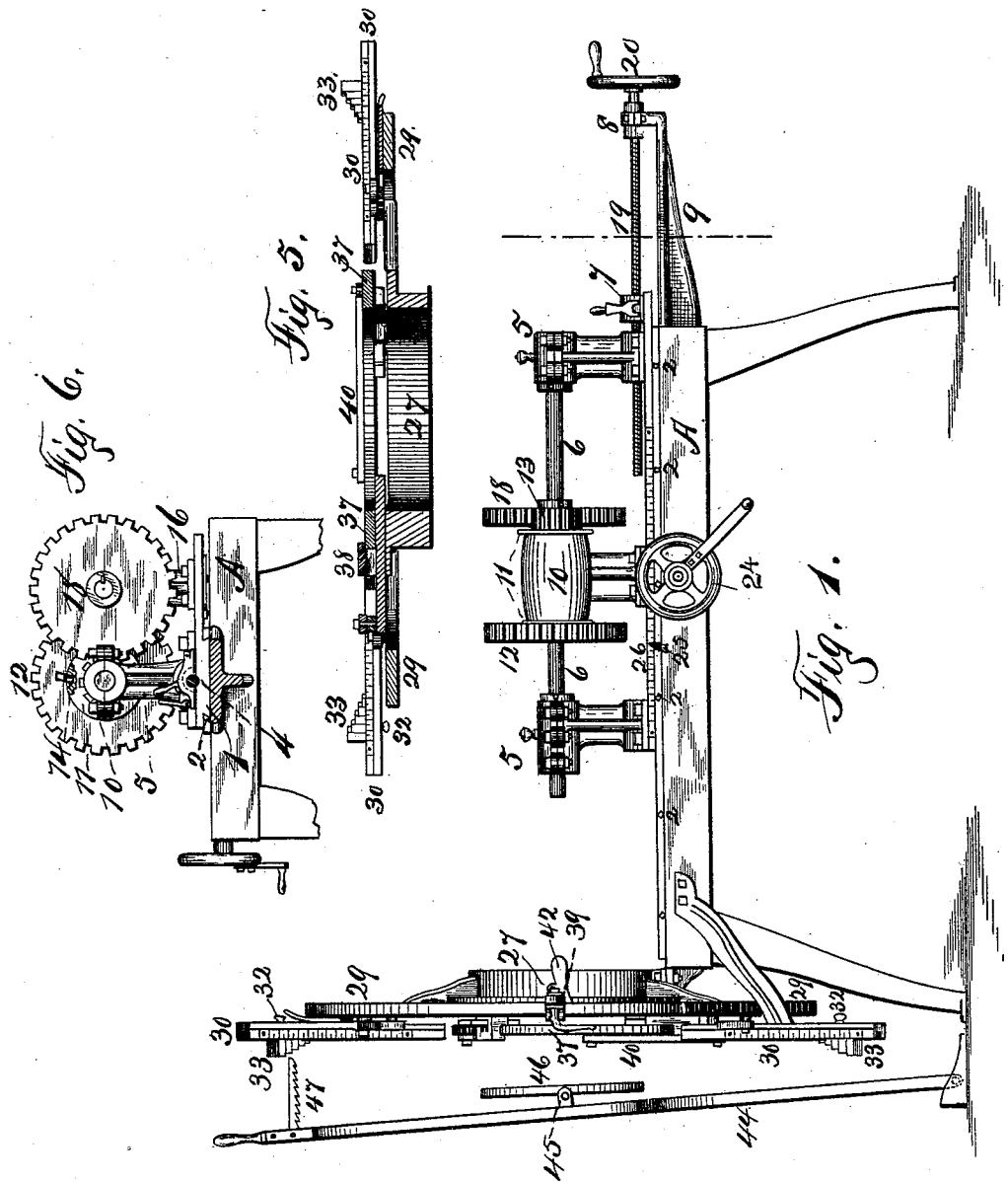
Witnesses  
H. A. Carhart  
E. V. Mack
Inventor  
William E. Kane  
By his Attorneys  
Smith + Denison (No Model.) 6 Sheets—Sheet 2.
W. E. KANE.
HUB BORING MACHINE.
No. 486,407. Patented Nov. 15, 1892.
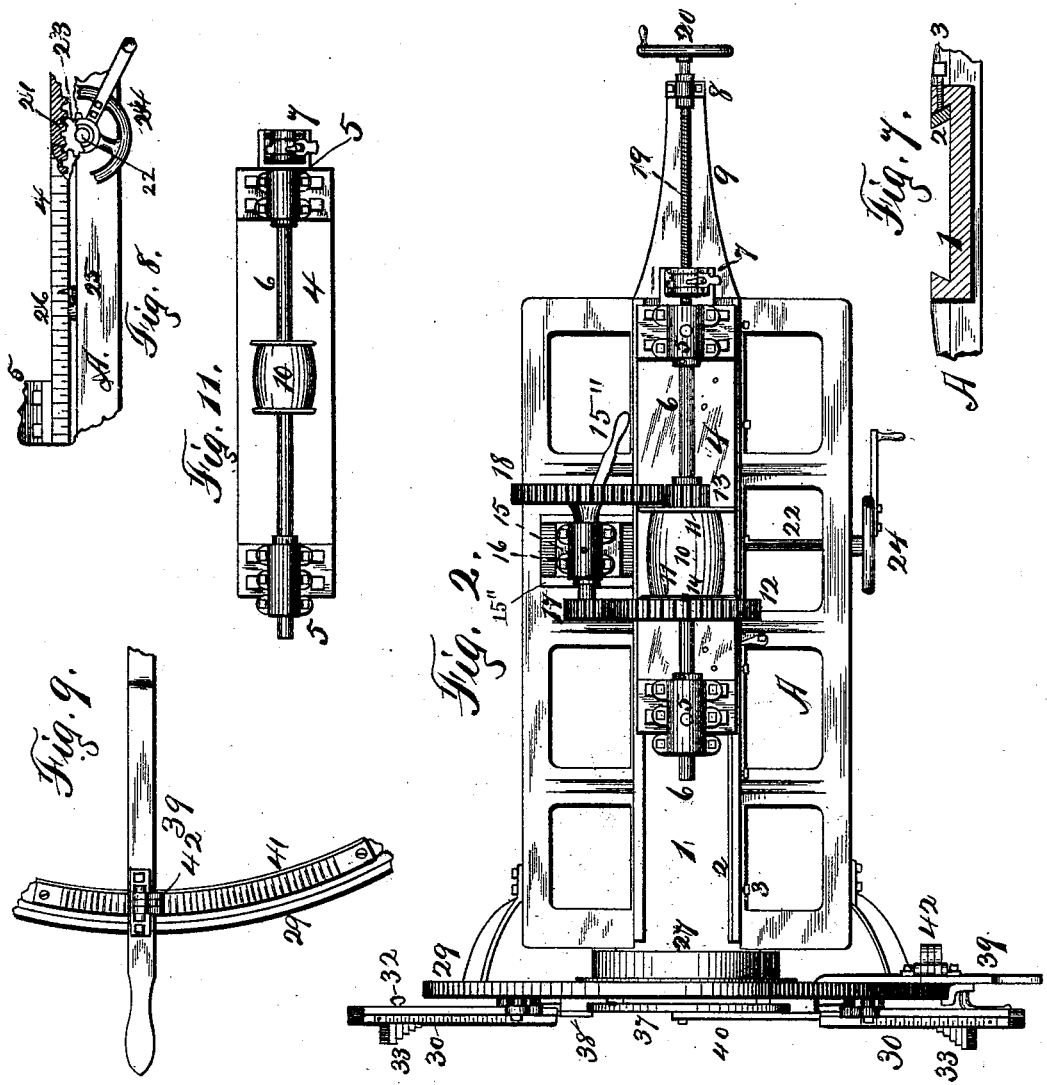

(No Model.) 6 Sheets—Sheet 3.
W. E. KANE.
HUB BORING MACHINE.
No. 486,407. Patented Nov. 15, 1892.
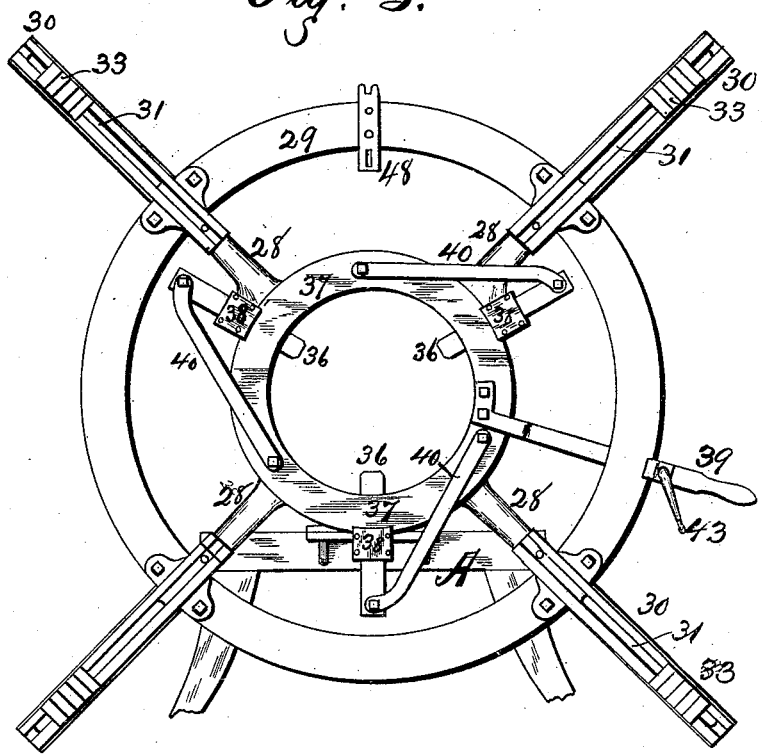
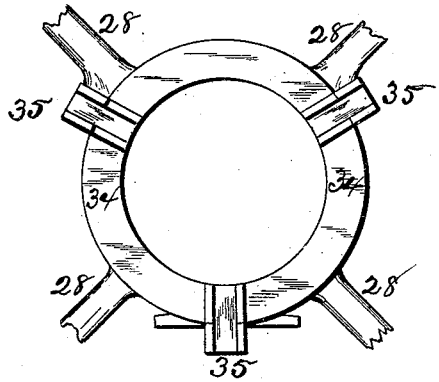
Witnesses
H. A. Carhart.
E. V. Mack
William E. Kane Inventor
By his Attorneys
Smith & Denison (No Model.)  6 Sheets—Sheet 4.
W. E. KANE.
HUB BORING MACHINE.
No. 486,407. Patented Nov. 15, 1892.
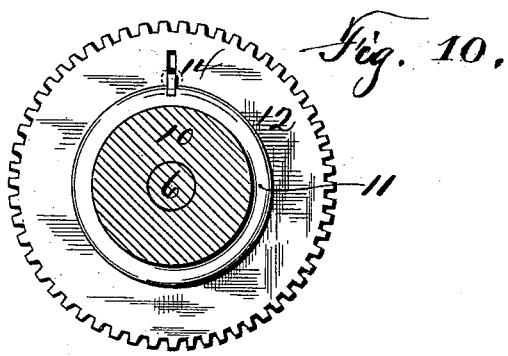
Fig. 10.
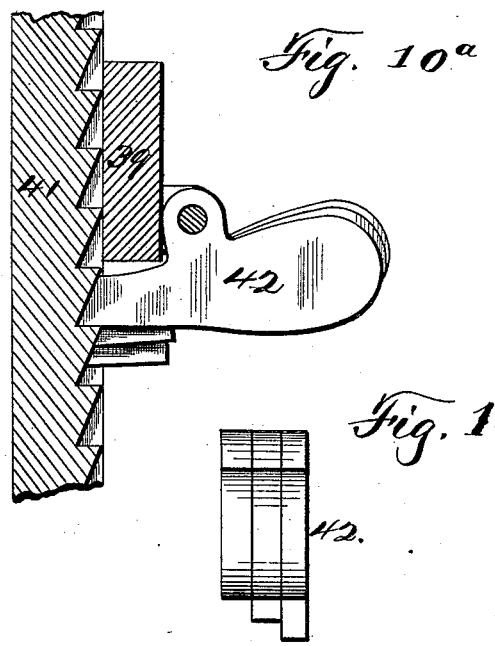
Fig. 10ª
Fig. 10ᵇ
WITNESSES:  
H. A. Carhart  
O. B. Kinne
INVENTOR,  
William E. Kane  
BY  
Smith & Denison  
his ATTORNEYS (No Model.) 6 Sheets—Sheet 5.
W. E. KANE.
HUB BORING MACHINE.
No. 486,407. Patented Nov. 15, 1892.
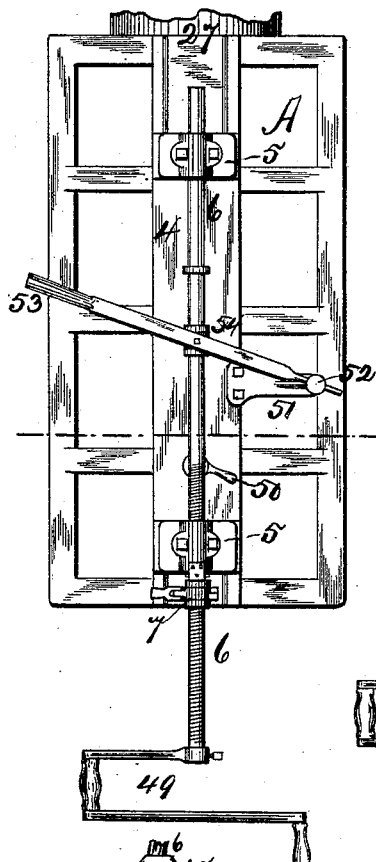
Witnesses
H. A. Carhart
E. V. Mack
Inventor
William E. Kane
By his Attorneys
Smith & Denison (No Model.) 6 Sheets—Sheet 6.
W. E. KANE.
HUB BORING MACHINE.
No. 486,407. Patented Nov. 15, 1892.
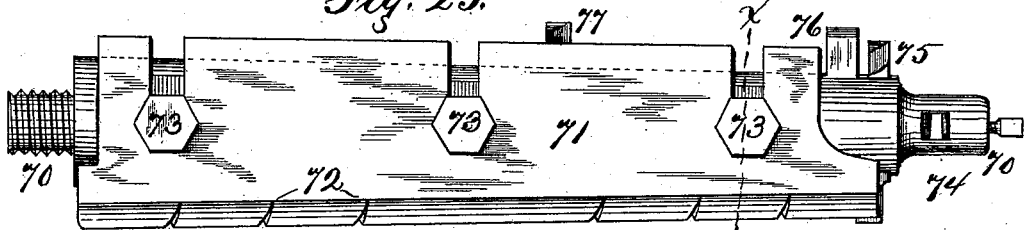
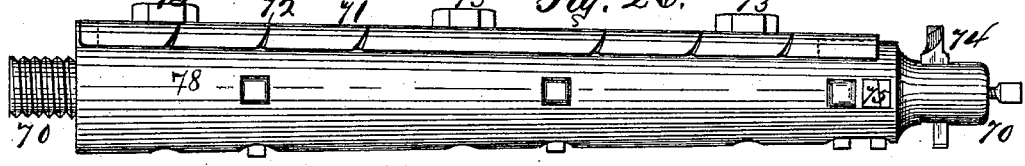
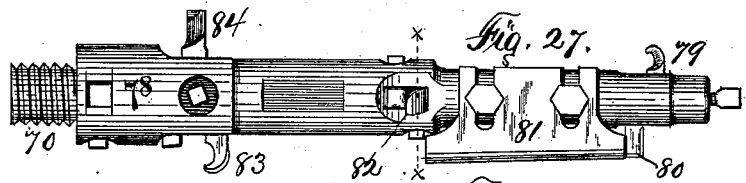
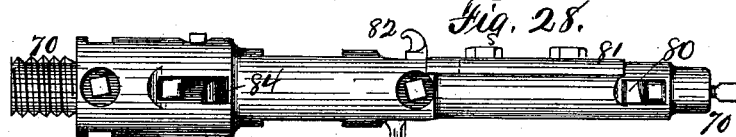
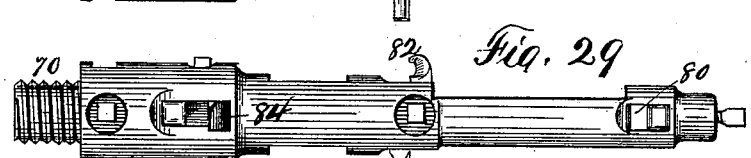
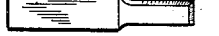
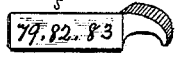
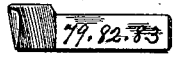
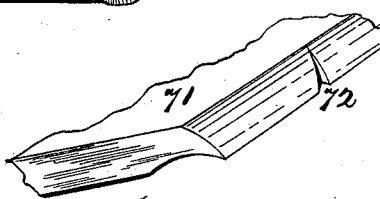
Witnesses
H. A. Carhart
E. V. Mack
Inventor
William E. Kane
By his Attorneys
Smith & Denison
THE NORRIS PETERS CO., PHOTO-LITHO., WASHINGTON, D. C.

UNITED STATES PATENT OFFICE.

WILLIAM E. KANE, OF SYRACUSE, ASSIGNOR OF ONE-HALF TO WILLIAM F. MORRIS, OF BALDWINSVILLE, NEW YORK.

HUB-BORING MACHINE.

SPECIFICATION forming part of Letters Patent No. 486,407, dated November 15, 1892.

Application filed November 14, 1890. Serial No. 371,399. (No model.)

*To all whom it may concern:*

Be it known that I, WILLIAM E. KANE, of Syracuse, in the county of Onondaga and State of New York, have invented new and useful Improvements in Hub-Boring Machines, of which the following, taken in connection with the accompanying drawings, is a full, clear, and exact description.

My invention relates to boring-machines adapted to bore out hubs to receive the skeins or boxes.

The object of my invention is to produce an improved hub-boring machine provided with a chuck for holding the hub which will always center the hub, with a boring-bar mounted upon a carriage adapted to traverse the bed of the machine, with a high or low speed mechanism and means to change quickly from one to the other, with a novel boring-bar and knives, a novel wheel-grip adapted to receive wheels of varying dish and hold them rigidly while being bored, and with other novel appliances and mechanisms, as will hereinafter appear.

My invention consists in the several novel features of construction and operation hereinafter described, and which are specifically set forth in the claims hereunto annexed. It is constructed as follows, reference being had to the accompanying drawings, in which—

Figure 1 is a side elevation of the variable-speed power-machine. Fig. 2 is a top plan of the same. Fig. 3 is a front elevation of the chuck and rim holding arms. Fig. 4 is an elevation of the chuck-body with the front plate and jaws and jaw-operating mechanism removed. Fig. 5 is a vertical transverse section of the wheel-holder and chuck. Fig. 6 is a sectional elevation showing the traversing carriage or table and a front elevation of the high and low speed boring-bar mechanism on a line transverse to the bed and just in rear of the front bearing 5 of the boring-bar. Fig. 7 is a transverse section of the bed, showing the dovetail in which the sliding table traverses and the adjustable key or gib on one side to take up wear. Fig. 8 is a sectional elevation showing the bed, the scale thereon, the sliding table, and the rack-and-pinion mechanism by which the table is traversed by hand. Fig. 9 is a top plan of the lever and the rack-and-pawl mechanism by which the chuck-jaws are locked. Fig. 10 is a transverse section of the pulley 10, showing its flange in elevation and, also in elevation, the gear 12 and the pin detachably connecting it to said pulley. Fig. 10$^a$ is an enlarged sectional detail of the rack-bar, tripartite pawl, and its lever. Fig. 10$^b$ is a front elevation of the pawl. Fig. 11 is a top plan of the sliding table and boring-bar of a single-speed power-machine. Fig. 12 is a top plan of the bed and sliding table, boring-bar, its mountings, and operating mechanism in a single-speed hand-power machine for straight boring. Fig. 13 is a top plan thereof with the taper-boring attachments added, omitting the bed. Fig. 14 is a rear elevation of the hand-power machine shown in Fig. 12, showing the bar 6 as cut off close to the rear bearing 5, all of the driving-pulley mechanism being omitted in this class of machine. Fig. 15 is a front elevation of the cam mechanism for boring tapers. Fig. 16 is a rear elevation thereof. Fig. 17 is a side elevation thereof. Fig. 18 is a top plan of the ball-joint, carrying and allowing the rear end of the boring-bar to oscillate when the cam is used for boring tapers. Fig. 19 is a front elevation of the "half-nut" detached. Fig. 20 is a top plan of the ball-joint bearing for the shank of the boring-bar. Fig. 21 is a vertical section on line Y Y, Fig. 20. Fig. 22 is a front elevation of same. Fig. 23 is an enlarged top plan of the rear mounting of the boring-bar, as in Fig. 12, showing the half-nut open. Fig. 24 is a detail of the connection between the rear journal-box and the boring-bar, by means of which the sliding table carries the boring-bar with it, as in withdrawing the tool, when the half-nut is open and out of engagement with the thread of the boring-bar. Fig. 25 is a side elevation of the boring-bar provided with an adjustable notched cutting-knife or plain taper-boxes, a spoke-cutter, a steady rest in the front end, and a collar-knife. Fig. 26 is an inverted plan view of the same. Fig. 27 is a side elevation of a boring-bar for straight or taper "half-patent" boxes, having an adjustable knife for either, a middle knife for spokes, and a back knife for the swell of the box. Fig. 28 is a top plan of the same. Fig. 29 is a like view with the adjustable taper or straight knife removed. Figs. 30 and 31 are details of the front or center cutters shown in Figs. 25 and 26. Figs. 32, 33, and 34 are details of the curved cutters shown in Figs. 27, 28, and 29. Figs. 35 and 36 are respectively a vertical section of the knife in Fig. 25 on line X X and an isometrical elevation of an end of this knife. Fig. 37 is a transverse section on line X X, Fig. 27. Fig. 38 is a plan view of the backer or steady-rest removed.

A is the bed securely mounted upon said legs and provided on top with a longitudinal dovetail groove 1, in one side of which I place a gib or strip of metal 2, adjustable inwardly by means of the set screws 3, which bear against the outer face of said gib. In this groove I mount my sliding or traversing table 4. Upon this I erect the journal-boxes 5, in which I mount the shaft 6, and the half-nut 7 is also erected on said table, fitting over and engaging with the threaded rod 19, the rear end of which is mounted and adapted to rotate freely in the bearing 8 upon the ratchet 9, secured to the rear end of the bed. Upon the shaft 6 I mount the loose pulley 10, tapering each way from the center to the guard-flanges 11 upon the ends. In front of this pulley I secure or key the gear 12 upon this shaft, and in rear of this pulley I secure a pinion 13 upon the pulley and loose upon the shaft. A pin 14, through a slot of the gear 12, detachably connects it to the guard-flange on that side, said pin entering a slot in said flange when it is pushed in, so that then this gear rotates with the shaft, but is loose thereon when said pin is drawn back.

At 15 in Fig. 2 I show a slide in a slideway 15', connected to the table 4, and 16 is a bearing carrying the shaft which carries a back gearing consisting of the pinion 17 and gear 18 and is thrown in, bringing the gear 18 into mesh with the pinion 13 and the pinion 17 into mesh with the gear 12, and when this slide is thrown back by said lever 15'' then the pulley, its shaft, and the gear 12 and pinion revolve independent of the back gearing and at full speed. When the back gearing is in engagement, then the boring-shaft is on slow speed. By this mounting of the boring-shaft upon a traversing-table the front end of the boring-bar is always at the same distance from the front bearing of the shaft, and thus I avoid the spring and lateral vibration of this bar incident to the increase of such distance. By locking the half-nut 7 in engagement with the screw 19 and turning the hand-wheel 20 the table 4 and its forming-bar can be slowly fed up to or away from the work.

On the lower side of the sliding table I secure a rack 21, and on the transverse shaft 22 I secure a pinion 23, (see Fig. 8,) which is in engagement with this rack, and by the hand-wheel 24 the table 4 can be readily fed back and forth, the half-nut 7 being unlocked.

A pointer 25, erected upon the bed, indicates upon the gage 26 upon the edge of the table the distance of the travel of the boring-bar.

Upon the front end of the bed I mount a tubular extension 27 at right angles to and standing above the bed, so that the boring-bar will pass through its center, or substantially so. Upon the outer end of this tube I mount the spokes 28, which are secured to the rim 29. Upon each spoke and projecting out beyond the rim I secure the arms 30, each provided with a longitudinal slot 31 to receive a bolt 32, and each having a dovetail slideway upon its outer face in which I mount my felly-holder 33, to which the adjusting-bolt 32 is connected and which is constructed with steps, which by their projection adapt this holder to receive and engage the fellies of wheels of varying dish as well as those of different diameters through the adjustment of the holders radially. The tube 27 is provided with a ring 34 upon its outer end, and this ring is provided with three or more radial guideways 35, in each of which I mount the chuck-jaws 36, each consisting of a bar of metal adapted to slide in its way radially. A second ring 37 covers the ring 34 and holds the jaws in the ways, and it is held in position and so that it can be rotated by the overlapping blocks 38, secured to the walls of the ways exterior to the rings. A lever 39, secured to the outer ring, is the means for rotating it, and the connecting-rods 40, connected to the ring 37 and to the outer ends of the jaw-bars 36, operate to draw the jaws inward when the ring is rotated one way and to throw them out when it is rotated the other way, and thus when a wheel-hub is inserted into the chuck and the outer ring is rotated and the jaws are thrown inward they will grip the hub and center it automatically.

To hold the chuck-jaws in their engagement and to prevent any backward rotation of the ring, I place a rack 41, Fig. 9, upon the rim 29 and mount the tripartite pawl 42 upon the lever. This pawl consists of three parts (see Fig. 10ª) of such width of working face that the total width of the three is equal to that of one tooth of the rack, and being arranged in steps and operating independently only one section of the pawl is on engagement, so that I get a very fine adjustment—as, for instance, when the rack-tooth is one-eighth of an inch in width and the first pawl-section is engaged. In order to bring the second section into engagement, I am only obliged to move the pawl one twenty-fourth of an inch. A further movement of the same distance will bring the third section into engagement, and a like further movement of the ring will bring the first section into engagement with the next tooth. When the working parts of this chuck are of proper strength, this chuck will hold the hub against rotation while it is being bored. To further hold the hub in place, I pivot a lever 44 upon the floor, and upon the studs 45 thereon I pivotally mount the ring 46, which fits over the outer end of the hub and bears against the spokes. To lock this lever, I pivot a rack-bar 47 thereon, which is adapted to enter detachably and engage with a slot in a bar 48, secured upon the rim 29.

In Fig. 11 I show the sliding table, the pulley, its shaft, and the bearings therefor and the half-nut as used in a single-speed machine.

In Figs 12 to 24, inclusive, I illustrate my hand-power machine. In this I use the same bed, sliding table, boring-bar, and bearings as in the power-machine, except that the boring-bar shaft is threaded, and a double crank 49 upon the rear end thereof constitutes the means of its rotation, while the thread of the shaft constitutes the feed. In this construction, also, 50 is an ordinary cam or lever lock, by which I secure the sliding table in position after it is set, and also after boring a short distance I can open the half-nut 7, loosen the table, and slide it along, so as to reduce the distance between the front bearing and the cutting-knives to reduce the vibration of the boring-bar.

To withdraw the bar for clearing out chips, &c., I secure an arm 51 to the side of the table, erect a post 52 pivotally thereon, connect the lever 53 loosely thereto, and pivotally connect the lever to a collar 54 on the shaft, when by opening the half-nut and drawing back the lever the boring-tool is withdrawn.

In order to bore a tapering hole, I use the following mechanism: In place of the rear bearing I mount on the sliding table a frame 55, having a circular opening, in which I mount an eccentric 56 and hold it therein by the buttons 57. This eccentric is provided with a radial slot 58 and parallel slots 59 on either side. It is also provided with a threaded bearing 60 in line with the slot 58. An adjustable boring-shaft bearing 61 is mounted on the inner end of the screw 62, the shaft-hole therein coinciding with the slot 58, and 63 being guide-pins with thumb-screws fitting through the slots 59 into the rear face of this bearing-block. A longitudinal feather-way is cut in the boring-shaft, and 64 is a feather upon the block or tube $a$, fitting in the feather-way and connecting the shaft to the eccentric, so that the rotation of the shaft causes the cam to rotate in its seat. The tube $a$ is mounted between the points of the set-screws $b$, substantially as shown in Fig. 17, and the shaft passing through it part of the motion is taken up thereby. To accommodate the front end of the boring-shaft to this oscillatory movement of the rear end, I use a ball or rocking bearing for the front, constructed as follows: A base 65 is secured to the table, and 66 is a sectional bearing rounded out internally, the sections being hinged and locked together when closed, as shown, after the ball is inserted. A tube 67, having the ball 68 thereon, projects back from the bearing, and 69 is a half-nut, integral with the rear end of the tube or secured upon the end thereof, and in this construction the thread of the boring-shaft and of the half-nut regulates the feed. The bar can be retracted by the same mechanism shown in Fig. 12, opening the half-nut.

In Figs. 25 and 26 I illustrate my boring-bar used for boring hubs for plain taper-boxes, in which 70 is the boring-bar, flattened on one side to receive the knife 71, which is provided with the nicks or notches 72 to break up the shavings and which is slotted, as shown, to receive the retaining-bolts 73, and which can be adjusted upon said bolts to vary the taper, as desired. I mortise the front end transversely, and in it I secure the beveled clearing-knife 74. Back of this and at substantially a right angle to the cutter 74 I mount the cutter 75, which cuts the gain for the front of the box. Next back of this I mount in a transverse mortise my backer or steady-rest 76, adjustable to different sizes of bore, by means of a set-screw, and which, standing opposite to the cutting-edge of the knife 71, holds the front end of the boring-bar steady, so that the pressure will not spring it away from the work and the knife will cut true and clean. A little in front of the center I mount in a transverse mortise a spoke-cutter 77, and at 78 is a mortise to receive a cutter for cutting the seat for the collar of the box.

In Figs. 27, 28, and 29 I illustrate my boring-bar and cutters for boring hubs for what are known as "half-patent" boxes, and in which 79 is a clearing-cutter. 80 is a smoothing or finishing cutter. 81 is the adjustable taper-knife. 82 is the spoke-cutter, and 83 and 84 are the cutters for cutting out and smoothing the seat for the box-collar or box-swell. In Figs. 30 and 31 I show details of the smoothing or finishing or spoke cutters. In Figs. 32, 33, and 34 I show details of the curved blade-cutters. In Figs. 35 and 36 I show more clearly the form of the taper-cutting knife 71. All of these boring-bars are adapted to be used upon my power or my hand machines whether single or double speed.

In Fig. 38 I show the backer or rest 76 detached, showing in plan the shank which fits in the mortise and the head 85 with its rounded bearing-face.

What I claim as my invention, and desire to secure by Letters Patent, is—

1. The combination, with the bed, the sliding table mounted in a longitudinal way thereon, the bearings erected upon the table, the boring-shaft mounted therein, the drive-pulley and the gear and pinion mounted upon the shaft, and means to connect the gear to the pulley, of an arm secured to the table, provided with a way thereon transverse to the table, a slide mounted in said way, a bearing on said slide, a shaft in said bearing, a gear and pinion upon said shaft, and a lever connected to said slide.

2. The combination, with the bed, the sliding table mounted in a longitudinal way thereon, the bearings erected upon the table, and the boring-shaft mounted in them, of a stationary ring mounted upon said bed, spokes radiating therefrom, a rim upon said spokes, slotted arms radiating from said rim and adjustable felly-holders mounted upon said arms, radial guides in said stationary ring, sliding jaws in said guides, a loose ring placed upon the stationary one and covering said guides, connecting-rods between the jaws and the loose ring, and a lever connected to the loose ring.

3. The combination, with the bed, the sliding table mounted in a longitudinal way thereon, the bearings erected upon the table, and the boring-shaft mounted in them, of a stationary ring mounted upon said bed, spokes radiating therefrom, a rim upon said spokes, slotted arms radiating from said rim and adjustable felly-holders mounted upon said arms, radial guides in said stationary ring, sliding jaws in said guides, a loose ring placed upon the stationary one and covering said guides, connecting-rods between the jaws and the loose ring, and a lever connected to the loose ring, and a vertical lever 44, hinged to the floor, a ring pivoted between studs upon said lever and fitting over the outer end of the hub, and a ratchet pivoted upon said lever and engaging with said rim.

In witness whereof I have hereunto set my hand on this 2d day of October, 1890.

WILLIAM E. KANE.

In presence of—
EDWIN P. FOSS,
H. P. DENISON.